United States Patent
Shin et al.

(10) Patent No.: US 9,621,283 B1
(45) Date of Patent: Apr. 11, 2017

(54) MOLECULAR COMMUNICATION SYSTEM AND METHOD OF OPERATING MOLECULAR COMMUNICATION SYSTEM

(71) Applicant: UNIVERSITY-INDUSTRY COOPERATION GROUP OF KYUNG HEE UNIVERSITY, Yongin-si (KR)

(72) Inventors: Hyun-Dong Shin, Suwon-si (KR); Dung Phuong Trinh, Yongin-si (KR); Trang Ngoc Cao, Yongin-si (KR); Young-Min Jeong, Seongnam-si (KR)

(73) Assignee: UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 0 days.

(21) Appl. No.: 15/053,828

(22) Filed: Feb. 25, 2016

(30) Foreign Application Priority Data

Dec. 14, 2015 (KR) .......................... 10-2015-0178022

(51) Int. Cl.
G06F 19/00 (2011.01)
H04B 13/00 (2006.01)
H04L 27/02 (2006.01)

(52) U.S. Cl.
CPC ............. *H04B 13/00* (2013.01); *H04L 27/02* (2013.01)

(58) Field of Classification Search
CPC .................................. H04B 13/00; H04L 27/02
See application file for complete search history.

(56) References Cited

U.S. PATENT DOCUMENTS

| 8,315,807 | B2 | 11/2012 | Hiyama et al. | |
| 2004/0171002 | A1* | 9/2004 | Desmet | B01F 5/061 435/6.12 |
| 2011/0234223 | A1* | 9/2011 | McColl | G01R 33/56509 324/309 |
| 2012/0206798 | A1* | 8/2012 | Knop | G02B 21/002 359/385 |
| 2016/0018504 | A1* | 1/2016 | Magin | A61B 5/055 324/309 |

FOREIGN PATENT DOCUMENTS

KR 10-2007-0063517 6/2007
KR 10-2015-0079357 7/2015

* cited by examiner

*Primary Examiner* — Dac Ha
(74) *Attorney, Agent, or Firm* — Staas & Halsey LLP

(57) ABSTRACT

A molecular communication system includes a molecular transmitter, a molecular receiver and a molecular transmission channel. The molecular transmitter transmits at least one molecule representing first data. The molecular receiver receives the at least one molecule, and obtains the first data based on the at least one molecule. The molecular transmission channel is connected between the molecular transmitter and the molecular receiver, and provides a transmission path for the at least one molecule. The at least one molecule moves in the molecular transmission channel based on an anomalous diffusion process. The anomalous diffusion process in the molecular transmission channel is modeled based on a fractional diffusion equation (FDE).

10 Claims, 8 Drawing Sheets

|  | DATA TRANSMISSION RATE[bits/s] | | | | |
|---|---|---|---|---|---|
|  | 0.1 | 0.5 | 1 | 5 | 10 |
| CASE1 | 9.82 | 6.79 | 2.86 | 0.58 | 0.13 |
| CASE2 | 10 | 9.35 | 7.15 | 4.38 | 1.84 |
| CASE3 | 10 | 10 | 10 | 8.04 | 4.29 |

MOLECULAR COMMUNICATION SYSTEM AND METHOD OF OPERATING MOLECULAR COMMUNICATION SYSTEM

CROSS-REFERENCE TO RELATED APPLICATION

This application claims priority under 35 U.S.C. §119 to Korean Patent Application No. 10-2015-0178022, filed on Dec. 14, 2015 in the Korean Intellectual Property Office (KIPO), the contents of which are herein incorporated by reference in their entirety.

BACKGROUND

1. Technical Field

Example embodiments relate generally to communication systems, and more particularly to molecular communication systems that transmit information based on molecules and methods of operating the molecular communication systems.

2. Description of the Related Art

As communication systems evolve to complex systems, the number of communication devices in a single communication system has increased, and then collisions and interferences between the communication devices have also increased. The performance of the communication system can be degraded due to the collisions and the interferences, and thus researchers are conducting various research projects on techniques of improving the performance of the communication system.

A molecular communication system, which is an example of various communication methods, has been researched. In the molecular communication system, molecules can be used as information carriers. The molecular communication system may have advantages including low power consumption and high adaptability for a human body, however, may also have disadvantages including low data transmission speed and low data accuracy.

SUMMARY

Accordingly, the present disclosure is provided to substantially obviate one or more problems due to limitations and disadvantages of the related art.

At least one example embodiment of the present disclosure provides a molecular communication system capable of having an improved channel performance.

At least one example embodiment of the present disclosure provides a method of operating a molecular communication system capable of having an improved channel performance.

According to example embodiments, a molecular communication system includes a molecular transmitter, a molecular receiver and a molecular transmission channel. The molecular transmitter transmits at least one molecule representing first data. The molecular receiver receives the at least one molecule, and obtains the first data based on the at least one molecule. The molecular transmission channel is connected between the molecular transmitter and the molecular receiver, and provides a transmission path for the at least one molecule. The at least one molecule moves in the molecular transmission channel based on an anomalous diffusion process. The anomalous diffusion process in the molecular transmission channel is modeled based on a fractional diffusion equation (FDE).

In an example embodiment, an existence probability $w(x,t)$ of the at least one molecule in the molecular transmission channel may satisfy Equation 1:

$$w(x, t) = \frac{1}{\alpha |x|} H_{3,3}^{2,1}\left[\frac{|x|}{K^{\frac{1}{\alpha}} t^{\frac{\mu}{\alpha}}} \middle| \begin{array}{c} \left(1, \frac{1}{\alpha}\right), \left(1, \frac{\mu}{\alpha}\right), \left(1, \frac{1}{2}\right) \\ (1, 1), \left(1, \frac{1}{\alpha}\right), \left(1, \frac{1}{2}\right) \end{array}\right] \quad \text{[Equation 1]}$$

where x denotes a position in the molecular transmission channel, t denotes a time after the at least one molecule is output from the molecular transmitter, K denotes a diffusion coefficient, $\mu$ denotes a divergence of waiting time, $\alpha$ denotes a divergence of jump length, and H denotes Fox's H-function.

In an example embodiment, a probability density function $f_T(t)$ of a first passage time (FPT) T may satisfy Equation 2 and Equation 3:

$$f_T(t) = H_{3,3}^{2,1}(1/t; P_{pdf}) \quad \text{[Equation 2]}$$

$$P_{pdf} = \left(\frac{2K^{1/\mu}}{\alpha a^{\alpha/\mu}}, \frac{a^{\alpha/\mu}}{K^{1/\mu}}, \left(1 + \frac{1}{\mu}, 2, 1 + \frac{\alpha}{2\mu}\right),\right.$$
$$\left.\left(1 + \frac{\alpha}{\mu}, 1 + \frac{1}{\mu}, 1 + \frac{\alpha}{2\mu}\right), \left(\frac{1}{\mu}, 1, \frac{\alpha}{2\mu}\right), \left(\frac{\alpha}{\mu}, \frac{1}{\mu}, \frac{\alpha}{2\mu}\right)\right) \quad \text{[Equation 3]}$$

where $a$ denotes a length of the molecular transmission channel. The FPT may correspond an elapsed time during which the at least one molecule is output from the molecular transmitter, and then is arrived at the molecular receiver.

In an example embodiment, the molecular transmitter may perform an encoding operation based on a timing modulation in which the first data is encoded by controlling an output timing of the at least one molecule.

In an example embodiment, the molecular transmitter may output a single molecule representing single data within a predetermined duration. When the first data corresponds to a first bit value, the molecular transmitter may output a single first molecule at a starting point of a first duration for transmitting the first data. When the first data corresponds to a second bit value different from the first bit value, the molecular transmitter may output the single first molecule at a middle point of the first duration for transmitting the first data.

In an example embodiment, the molecular transmitter may perform an encoding operation based on an amplitude modulation in which the first data is encoded by controlling a number of the at least one molecule.

In an example embodiment, the molecular transmitter may output a plurality of molecules representing single data within a predetermined duration. When the first data corresponds to a first bit value, the molecular transmitter may output a first number of first molecules within a first duration for transmitting the first data. When the first data corresponds to a second bit value different from the first bit value, the molecular transmitter may output a second number of the first molecules within the first duration for transmitting the first data. The first number may be less than a reference number, and the second number may be equal to or greater than the reference number.

In an example embodiment, the molecular transmitter may further include a molecular supply unit, an encoding unit and a molecular emitting unit. The molecular supply unit may provide the at least one molecule. The encoding unit may perform an encoding operation on the at least one molecule based on one of a timing modulation and an amplitude modulation. The molecular emitting unit may output the at least one molecule.

In an example embodiment, the molecular receiver may further include a molecular receiving unit, a decoding unit and a molecular handling unit. The molecular receiving unit may receive the at least one molecule. The decoding unit may perform a decoding operation on the at least one molecule to obtain the first data. The molecular handling unit may store, decompose or discharge the at least one molecule.

According to example embodiments, in a method of operating a molecular communication system, at least one molecule representing first data is transmitted by a molecular transmitter. The at least one molecule is moved based on an anomalous diffusion process in a molecular transmission channel. The at least one molecule is received by a molecular receiver to obtain the first data based on the at least one molecule. The molecular transmission channel is connected between the molecular transmitter and the molecular receiver. The anomalous diffusion process in the molecular transmission channel is modeled based on a fractional diffusion equation (FDE).

In an example embodiment, an existence probability w(x,t) of the at least one molecule in the molecular transmission channel may satisfy Equation 4:

$$w(x,t) = \frac{1}{\alpha|x|} H_{3,3}^{2,1} \left[ \frac{|x|}{K^{\frac{1}{\alpha}} t^{\frac{\mu}{\alpha}}} \middle| \begin{array}{c} \left(1, \frac{1}{\alpha}\right), \left(1, \frac{\mu}{\alpha}\right), \left(1, \frac{1}{2}\right) \\ (1,1), \left(1, \frac{1}{\alpha}\right), \left(1, \frac{1}{2}\right) \end{array} \right]$$ [Equation 4]

where x denotes a position in the molecular transmission channel, t denotes a time after the at least one molecule is output from the molecular transmitter, K denotes a diffusion coefficient, μ denotes a divergence of waiting time, α denotes a divergence of jump length, and H denotes Fox's H-function.

In an example embodiment, a probability density function $f_T(t)$ of a first passage time (FPT) T may satisfy Equation 5 and Equation 6:

$$f_T(t) = H_{3,3}^{2,1}(1/t; P_{pdf})$$ [Equation 5]

$$P_{pdf} = \left( \frac{2K^{1/\mu}}{\alpha a^{\alpha/\mu}}, \frac{a^{\alpha/\mu}}{K^{1/\mu}}, \left(1 + \frac{1}{\mu}, 2, 1 + \frac{\alpha}{2\mu}\right), \right.$$
$$\left. \left(1 + \frac{\alpha}{\mu}, 1 + \frac{1}{\mu}, 1 + \frac{\alpha}{2\mu}\right), \left(\frac{1}{\mu}, 1, \frac{\alpha}{2\mu}\right), \left(\frac{\alpha}{\mu}, \frac{1}{\mu}, \frac{\alpha}{2\mu}\right) \right)$$ [Equation 6]

where α denotes a length of the molecular transmission channel. The FPT may correspond an elapsed time during which the at least one molecule is output from the molecular transmitter, and then is arrived at the molecular receiver.

In an example embodiment, the molecular transmitter may output a single molecule representing single data within a predetermined duration. In transmitting the at least one molecule, when the first data corresponds to a first bit value, a single first molecule may be output at a starting point of a first duration for transmitting the first data. When the first data corresponds to a second bit value different from the first bit value, the single first molecule may be output at a middle point of the first duration for transmitting the first data.

In an example embodiment, the molecular transmitter may output a plurality of molecules representing single data within a predetermined duration. In transmitting the at least one molecule, when the first data corresponds to a first bit value, a first number of first molecules may be output within a first duration for transmitting the first data. When the first data corresponds to a second bit value different from the first bit value, a second number of the first molecules may be output within the first duration for transmitting the first data. The first number may be less than a reference number, and the second number may be equal to or greater than the reference number.

In the molecular communication system according to example embodiments, the at least one molecule may move based on the anomalous diffusion process in the molecular transmission channel that connects the molecular transmitter with the molecular receiver. The anomalous diffusion process in the molecular transmission channel 300 may be modeled based on the FDE. Accordingly, the molecular transmission channel may have a relatively improved performance, and thus the molecular communication system may have a relatively high data transmission speed and high data accuracy.

BRIEF DESCRIPTION OF THE DRAWINGS

Illustrative, non-limiting example embodiments will be more clearly understood from the following detailed description taken in conjunction with the accompanying drawings.

DETAILED DESCRIPTION OF THE EMBODIMENTS

Figure 1:
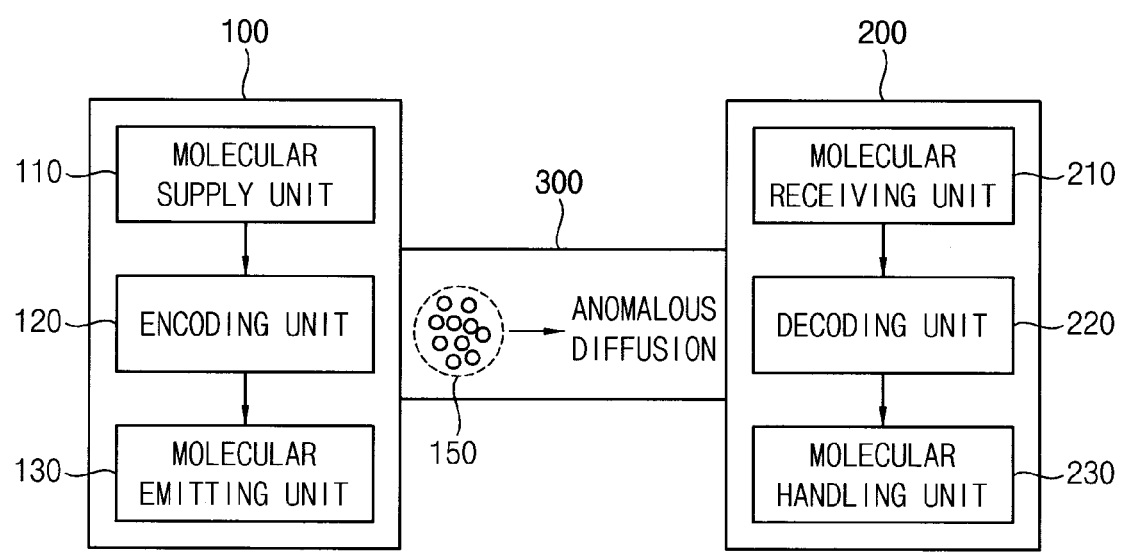
FIG. 1 is a block diagram illustrating a molecular communication system according to example embodiments.

Various example embodiments will be described more fully with reference to the accompanying drawings, in which embodiments are shown. The present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a molecular communication system according to example embodiments.

Referring to FIG. 1, a molecular communication system 10 includes a molecular transmitter 100, a molecular receiver 200 and a molecular transmission channel 300.

In the molecular communication system 10, information may be transmitted based on a plurality of molecules 150. In other words, the plurality of molecules 150 may be used as information carriers. In some example embodiments, the plurality of molecules 150 may be homogeneous (e.g., may include the same type of molecules). In other example embodiments, the plurality of molecules 150 may be heterogeneous (e.g., may include different types of molecules).

The molecular transmitter 100 transmits at least one molecule representing first data. The molecular transmitter 100 may include a molecular supply unit 110, an encoding unit 120 and a molecular emitting unit 130.

The molecular supply unit 110 may provide the plurality of molecules 150 including the at least one molecule. For example, the molecular supply unit 110 may generate the plurality of molecules 150, or may receive the plurality of molecules 150 from an external device.

The encoding unit 120 may perform an encoding operation on the at least one molecule such that the at least one molecule represents the first data. For example, the first data may correspond to a first bit value (e.g., "0"), or may correspond to a second bit value (e.g., "1") different from the first bit value. In some example embodiments, the encoding operation may be performed by controlling an output timing (e.g., a release timing or an emission timing) of the at least one molecule. In other example embodiments, the encoding operation may be performed by controlling the number of the at least one molecule.

The molecular emitting unit 130 may be connected to the molecular transmission channel 300, and may output the at least one molecule to the molecular transmission channel 300.

The molecular receiver 200 receives the at least one molecule, and obtains the first data based on the at least one molecule. The molecular receiver 200 may include a molecular receiving unit 210, a decoding unit 220 and a molecular handling unit 230.

The molecular receiving unit 210 may be connected to the molecular transmission channel 300, and may receive the at least one molecule from the molecular transmission channel 300. For example, the molecular receiving unit 210 may include at least one sensor that detects an arrival of the at least one molecule.

The decoding unit 220 may perform a decoding operation on the at least one molecule to obtain the first data. In some example embodiments, the decoding operation may be performed based on an arrival timing of the at least one molecule. In other example embodiments, the decoding operation may be performed based on the number of the at least one molecule.

The molecular handling unit 230 may store, may decompose or may discharge the plurality of molecules 150 including the at least one molecule.

The molecular transmission channel 300 is connected between the molecular transmitter 100 (e.g., the molecular emitting unit 130) and the molecular receiver 200 (e.g., the molecular receiving unit 210). The molecular transmission channel 300 provides a transmission path for the at least one molecule. In other words, the at least one molecule may move from the molecular transmitter 100 to the molecular receiver 200 through the molecular transmission channel 300. In the molecular communication system 10 according to example embodiments, the at least one molecule moves in the molecular transmission channel 300 based on an anomalous diffusion process.

Brownian motion describes completely free and random movement of molecules induced by collision with vicinity molecules, and is fully characterized by the linear dependence of the mean squared displacement in time. In a conventional molecular communication system, Brownian motion has been widely used for ideal and simple diffusion environments (e.g., homogeneous, no outer forces, negligible interaction, spherical molecules, elastic collision, etc.). However, various potential applications of a molecular communication system can not be limited in such ideal environments. For example, the diffusion observed by experiments in crowded, heterogeneous, and/or complex structure system can not be modeled by Brownian motion due to the fractional-power dependence of the mean squared displacement in time. Accordingly, an anomalous diffusion model may be used for non-ideal and/or complex environments. In the molecular communication system 10 according to example embodiments, the movement of the at least one molecule in the molecular transmission channel 300 may be described based on the anomalous diffusion process. In other words, the molecular transmission channel 300 according to example embodiments may be an anomalous diffusion channel.

In some example embodiments, the anomalous diffusion process in the molecular transmission channel 300 may be modeled based on a fractional diffusion equation (FDE).

Hereinafter, a modeling of the molecular transmission channel 300 will be described in detail.

The at least one molecule may move (e.g., diffuse) from a diffusion starting point to a diffusion ending point based on the anomalous diffusion process. The diffusion starting point may indicate a position at which the molecular transmission channel 300 is connected to the molecular transmitter 100. The diffusion ending point may indicate a position at which the molecular transmission channel 300 is connected to the molecular receiver 200. The movement of the at least one molecule in the molecular transmission channel 300 may be modeled to an one-dimensional anomalous diffusion propagation based on Caputo fractional derivative diffusion equation, and may satisfy Equation 7.

$$(D_{0+}^{\mu,1} w(x,t))(T) = K \frac{\partial^\alpha}{\partial |x|^\alpha} w(x,t), \ t > 0 \quad \text{[Equation 7]}$$

In Equation 7, x denotes a position in the molecular transmission channel, and t denotes a time after the at least one molecule is output from the molecular transmitter 100. For example, x may be zero at the diffusion starting point, and t may be zero at a time point at which the at least one molecule is output from the molecular transmitter 100. In Equation 7, w(x,t) denotes an existence probability of the at least one molecule in the molecular transmission channel 300 depending on the position x and the time t. In Equation 7, K denotes a diffusion coefficient, μ is related to a divergence of waiting time, and α is related to a divergence of jump length. For example, μ may be greater than zero and may be equal to or less than one (e.g., 0<μ≤1), and α may be greater than zero and may be equal to or less than two (e.g., 0<α≤2).

It may be assumed that the propagation environment has no boundary and the movement starts at an origin in an initial time. In this case, a solution of Equation 7 with a boundary condition of w(±∞,t)=0 for t>0 and an initial condition of w(x,0)=δ(x) may be given by Equation 8. In other words, the existence probability w(x,t) of the at least one molecule in the molecular transmission channel 300 depending on the position x and the time t may satisfy Equation 8.

$$w(x,t) = \frac{1}{\alpha |x|} H_{3,3}^{2,1} \left[ \frac{|x|}{K^{\frac{1}{\alpha}} t^{\frac{\mu}{\alpha}}} \left| \begin{array}{c} \left(1, \frac{1}{\alpha}\right), \left(1, \frac{\mu}{\alpha}\right), \left(1, \frac{1}{2}\right) \\ (1,1), \left(1, \frac{1}{\alpha}\right), \left(1, \frac{1}{2}\right) \end{array} \right. \right] \quad \text{[Equation 8]}$$

In Equation 8, H (e.g., $_{p,q}H^{m,n}(\bullet)$) denotes Fox's H-function.

Here, Fox's H-function may indicate H-transform of a function f(t) with Fox's H-kernel of an order sequence O=(m, n, p, q) and a parameter sequence P=(k, c, a, b, A, B), and may be defined by Equation 9.

$$F(s) = k \int_0^\infty H_{p,q}^{m,n}\left[ cst \left| \begin{array}{c} (a, \mathcal{A}) \\ (b, \mathcal{B}) \end{array}\right.\right] f(t) dt \ (s > 0) \quad \text{[Equation 9]}$$

A notation $\mathbb{H}_{p,q}^{m,n}\{f(t); P\}(s)$ may be used to denote H-transform of the function f(t). By convention, null sequences may be $P_\emptyset = (1, 1, -, -, -, -)$ and $O_\emptyset = (0, 0, 0, 0)$, and Fox's H-function may satisfy Equation 10 and Equation 11.

$$H_{0,0}^{0,0}(t; P_\emptyset t-1) \quad \text{[Equation 10]}$$

$$\mathbb{H}_{0,0}^{0,0}\{f(t): P_\emptyset\}(s) = \frac{1}{s} f\left(\frac{1}{s}\right) \quad \text{[Equation 11]}$$

H-transform $\mathbb{H}_{p,q}^{m,n}\{f(t); P\}(s)$ may satisfy various properties. For example, H-transform $\mathbb{H}_{p,q}^{m,n}\{f(t); P\}(s)$ may satisfy a first property associated with symmetry, a second property associated with scaling (e.g., a scaling operation), a third property associated with conjugacy, a fourth property associated with differentiation (e.g., a differential operation), a fifth property associated with an elementary operation, and a sixth property associated with an inverse operation. In the first property, H-transform $\mathbb{H}_{p,q}^{m,n}\{f(t); P\}(s)$ may be symmetric in pairs of kernel parameters in $(a_1, A_1), \ldots, (a_n, A_n)$; in $(a_{n+1}, A_{n+1}), \ldots, (a_p, A_p)$; in $(b_1, B_1), \ldots, (b_m, B_m)$; and in $(b_{m+1}, B_{m+1}), \ldots, (b_q, B_q)$. In the second property, H-transform may satisfy Equation 12 and Equation 13. In the third property, H-transform may satisfy Equation 14 and Equation 15. In the fourth property, H-transform may satisfy Equation 16 and Equation 17. In the fifth property, H-transform may satisfy Equation 18 when $f(t) = H_{p2,q2}^{m2,m2}(t; P_2)$. In the sixth property, H-transform may satisfy Equation 19 and Equation 20 when $f(t) = H_{p2,q2}^{m2,m2}(t; P_2)$.

$$\mathbb{H}_{p,q}^{m,n}\{f(\alpha t); P\}(s) = \mathbb{H}_{p,q}^{m,n}\{f(t); P|\alpha>\}(s) \quad \text{[Equation 12]}$$

$$P|\alpha) \triangleq \left( \frac{k}{\alpha}, \frac{c}{\alpha}, a, b, \mathcal{A}, \mathcal{B} \right) \quad \text{[Equation 13]}$$

$$\mathbb{H}_{p,q}^{m,n}\{s^\gamma f(t); P\}(s) = \mathbb{H}_{p,q}^{m,n}\{t^{-\gamma} f(t); (1,1,\gamma|P)\}(s) \quad \text{[Equation 14]}$$

$$\langle \alpha, \beta, \gamma | P \triangleq \left( \frac{k}{(\alpha c)^{\beta \gamma}}, (\alpha c)^\beta, a + \beta\gamma\mathcal{A}, b + \beta\gamma\mathcal{B}, \beta\mathcal{A}, \beta\mathcal{B} \right) \quad \text{[Equation 15]}$$

$$(-1)^l \frac{\partial^l}{\partial s^l} \mathbb{H}_{p,q}^{m,n}\{f(t); P\}(s) = \mathbb{H}_{p+1,q+1}^{m+1,n}\{t^l f(t); \partial^l P\}(s) \quad \text{[Equation 16]}$$

$$\partial^l P \triangleq (kc^l, c, (a-l\mathcal{A}, -l), (0, b-l\mathcal{B}), (\mathcal{A}, 1), (l, \mathcal{B})) \quad \text{[Equation 17]}$$

$$\mathbb{H}_{p1,q1}^{m1,n1}\left\{ \frac{t^\gamma}{\beta} f(\alpha 1^{1/\beta}); P_1 \right\}(s) = \mathbb{H}_{p1,q1}^{m1,n1}\{H_{p2,q2}^{m2,n2}(t; \langle \alpha, \beta, \gamma | P_2 \rangle); P_1\}(s) \quad \text{[Equation 18]}$$

$$\mathbb{H}_{p1,q1}^{m1,n1}\{f(t^{-1}); P_1\}(s) = \mathbb{H}_{p1,q1}^{m1,n1}\{H_{q2,p2}^{n2,m2}(t; P_2^{-1}); P_1\}(s) \quad \text{[Equation 19]}$$

$$P^{-1} \triangleq \left( k, \frac{1}{c}, 1_q - b, 1_p - a, \mathcal{B}, \mathcal{A} \right) \quad \text{[Equation 20]}$$

In Equation 12 through Equation 20, each of α and β is a positive real number (e.g., α, β ∈ ℝ ++), γ is a complex number (e.g., γ ∈ ℂ), and l is a natural number (e.g., l ∈ ℕ). In Equation 12 through Equation 20, P|α) denotes the scaling operation on the parameter sequence P, <α, β, γ|P denotes the elementary operation on the parameter sequence P, $\partial^i$P denotes the differential operation on the parameter sequence P, and $P_{-1}$ denotes the inverse operation on the parameter sequence P.

Fox's H-function is described in detail in Youngmin Jeong, Hyundong Shin and Moe Z. Win, "H-Transforms for Wireless Communication", *IEEE Transactions on Information Theory*, vol. 61, no. 7, pp. 3773-3809, July 2015.

In some example embodiments, when a length of the molecular transmission channel 300 in the molecular communication system 10 is a, a first passage time (FPT) T may satisfy Equation 21.

$$T = \inf\{t; x(t) = \alpha\} \quad \text{[Equation 21]}$$

The FPT T may correspond an elapsed time during which the at least one molecule is output from the molecular transmitter 100, and then is arrived at the molecular receiver 200. As described above, x=0 at the diffusion starting point. In addition, x=α at the diffusion ending point. In other words, the FPT T may indicate such that a molecule starting at the position x=0 reaches the molecular receiver 200 for the first time at the distance x=α. The FPT T may be a key role to evaluate the performance of the molecular transmission channel 300.

In some example embodiments, a probability density function (PDF) $f_T(t)$ of the FPT T may satisfy Equation 22 and Equation 23, and a cumulative distribution function (CDF) $F_T(t)$ of the FPT T may satisfy Equation 24 and Equation 25.

$$f_T(t) = H_{3,3}^{2,1}(1/t; P_{pdf}) \quad \text{[Equation 22]}$$

$$P_{pdf} = \left( \frac{2K^{1/\mu}}{\alpha \mu^{\alpha/\mu}}, \frac{\alpha^{\alpha/\mu}}{K^{1/\mu}}, \left(1 + \frac{1}{\mu}, 2, 1 + \frac{\alpha}{2\mu}\right), \right. \quad \text{[Equation 23]}$$
$$\left. \left(1 + \frac{\alpha}{\mu}, 1 + \frac{1}{\mu} + \frac{\alpha}{2\mu}\right), \left(\frac{1}{\mu}, 1, \frac{\alpha}{2\mu}\right), \left(\frac{\alpha}{\mu}, \frac{1}{\mu}, \frac{\alpha}{2\mu}\right) \right)$$

$$F_T(t) = 1 - H_{4,4}^{2,2}(1/t; P_{cdf}) \quad \text{[Equation 24]}$$

$$P_{cdf} = \left( \frac{2}{\mu}, \frac{\alpha^{\alpha/\mu}}{K^{1/\mu}}, (1,1,1,1), \right. \quad \text{[Equation 25]}$$
$$\left. (1,1,1,0), \left(\frac{\alpha}{\mu}, \frac{1}{\mu}, 1, \frac{\alpha}{2\mu}\right), \left(\frac{\alpha}{\mu}, \frac{1}{\mu}, \frac{\alpha}{2\mu}, \frac{\alpha}{\mu}\right) \right)$$

Figure 2:
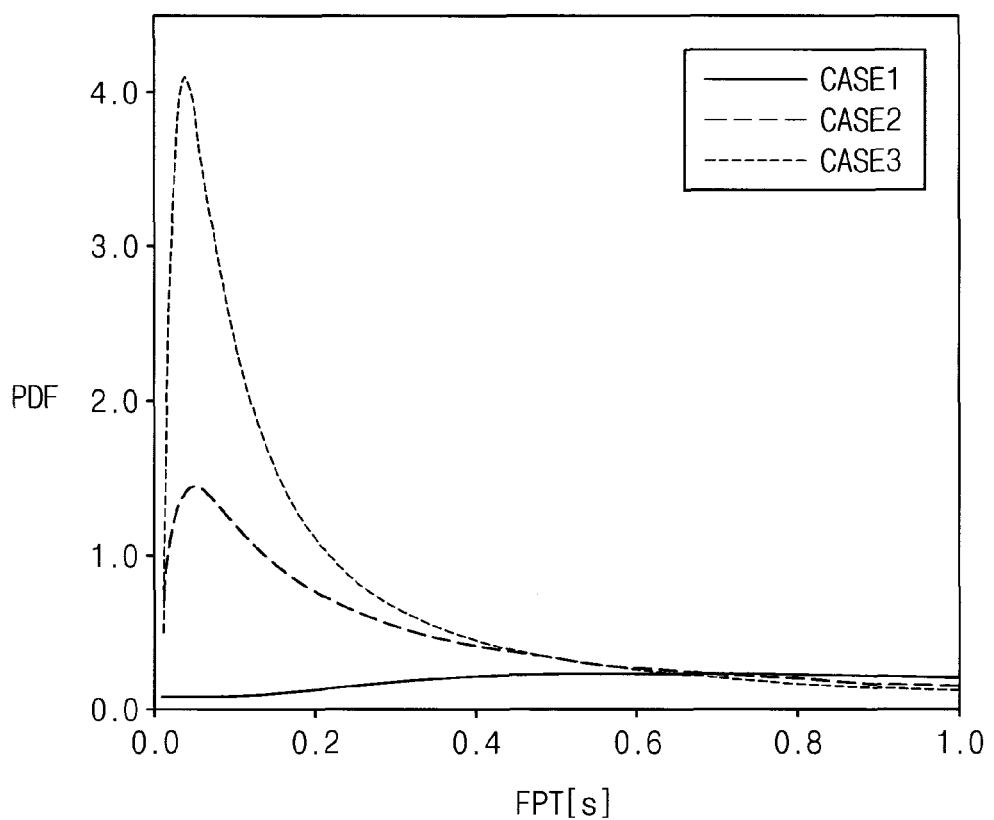
FIG. 2 is a diagram for describing a first passage time of a molecular transmission channel in the molecular communication system according to example embodiments.

FIG. 2 is a diagram for describing a first passage time of a molecular transmission channel in the molecular communication system according to example embodiments.

Referring to FIG. 2, a horizontal axis of a graph represents the FPT, and a vertical axis of the graph represents the PDF of the FPT. In FIG. 2, CASE1 is an example of a first anomalous diffusion (e.g., a superdiffusion) where (α, μ)= (1.76, 0.96), CASE2 is an example of a second anomalous diffusion (e.g., a subdiffusion) where (α, μ)=(1.88, 0.77), and CASE3 is an example of a normal diffusion where (α, μ)=(2, 1). In CASE1, CASE2 and CASE3, K=$10^{-9}$ [m$^2$/s], and α=1.5×$10^{-5}$ [m].

As illustrated in FIG. 2, the PDF of the FPT may be more dispersed for the examples of the anomalous diffusion (e.g., CASE1 and CASE2) according to example embodiments, in comparison to the example of the normal diffusion (e.g., CASE3). Accordingly, the molecular transmission channel 300 in the molecular communication system 10 according to example embodiments may have a relatively improved performance.

Referring back to FIG. 1, in some example embodiments, the molecular transmitter 100 may perform the encoding operation based on the timing modulation in which the first data is encoded by controlling an output timing of the at least one molecule.

In the timing modulation, the molecular transmitter 100 may output a single molecule representing single data within a predetermined duration (e.g., a predetermined time interval). In other words, a single first molecule may be used as an information carrier for the first data in the timing modulation. A molecule release time X of the molecular transmitter 100 may satisfy X ∈ {0, $T_b$/2} for the first bit value (e.g., "0") and the second bit value (e.g., "1").

In other words, when the first data corresponds to the first bit value in the timing modulation, the molecular transmitter 100 may output the single first molecule at a starting point of a first duration $T_b$ for transmitting the first data. When the first data corresponds to the second bit value in the timing modulation, the molecular transmitter 100 may output the single first molecule at a middle point of the first duration $T_b$ for transmitting the first data.

The molecular receiver 200 may perform the decoding operation based on an arrival time of the single first molecule. The arrival time may correspond a time at which the single first molecule is detected at the molecular receiver 200. For example, the arrival time $Y_{tm}$ may be $Y_{tm}$=X+T, and T may be the FPT.

In the timing modulation, a maximum likelihood detection may satisfy Equation 26 and Equation 27, and a bit error rate (BER) $P_b$ may satisfy Equation 28. In other words, information for the timing modulation in the anomalous diffusion may be decoded by the maximum likelihood detection based on the Equation 26 and Equation 27, and the BER for the timing modulation in the anomalous diffusion may be bounded by Equation 28.

$$f_{Y_{tm}|X}(y|x) = \begin{cases} f_T(y-x) & y > x \\ 0, & y \leq x \end{cases} \quad \text{[Equation 27]}$$

$$P_b < \frac{1}{\alpha} H_{4,4}^{2,2}\left[ \frac{a(2R)^{\frac{\mu}{\alpha}}}{K^{\frac{1}{\alpha}}} \middle| \begin{array}{c} (1,1), \left(1, \frac{1}{\alpha}\right), \left(1, \frac{\mu}{\alpha}\right), \left(1, \frac{1}{2}\right) \\ (1,1), \left(1, \frac{1}{\alpha}\right), \left(1, \frac{1}{2}\right), (0,1) \end{array} \right] \quad \text{[Equation 28]}$$

In Equation 8, R=$1/T_b$ [bits/s] denotes a data transmission rate or a data rate.

Figure 3:
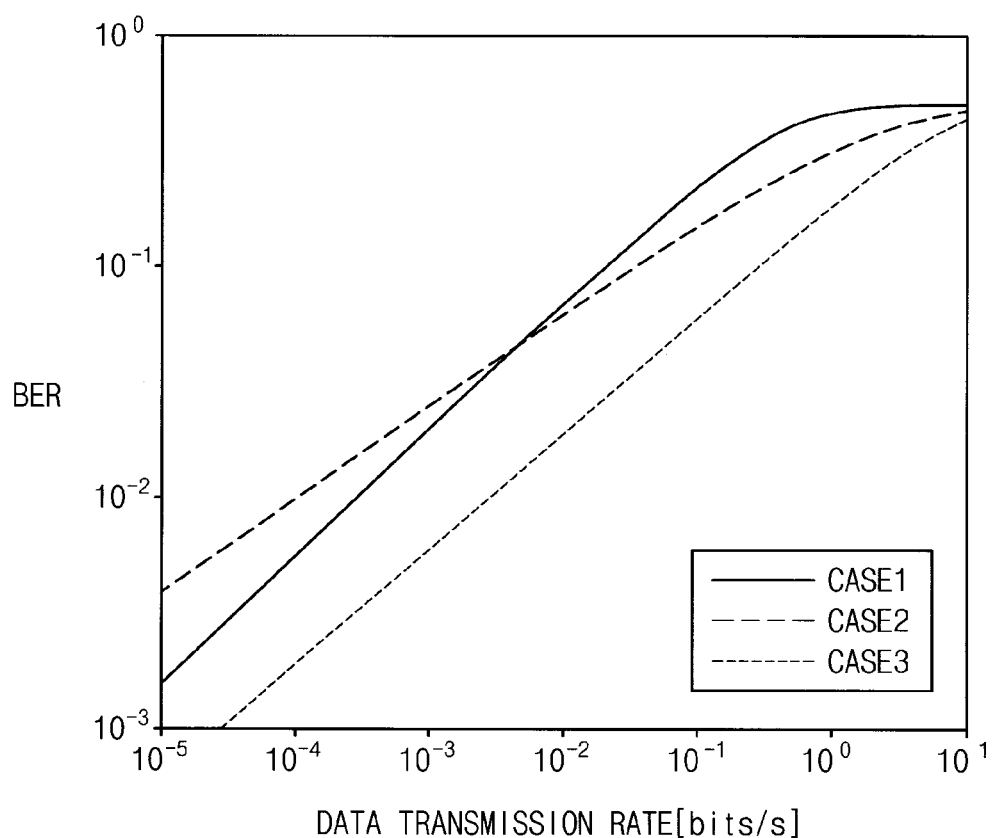
FIG. 3 is a diagram for describing a bit error rate for a timing modulation in the molecular communication system according to example embodiments.

FIG. 3 is a diagram for describing a bit error rate for a timing modulation in the molecular communication system according to example embodiments.

Referring to FIG. 3, a horizontal axis of a graph represents the data transmission rate, and a vertical axis of the graph represents the BER. CASE1, CASE2 and CASES in FIG. 3 may be substantially the same as CASE1, CASE2 and CASE3 in FIG. 2, respectively.

In the timing modulation, a low-rate slope ζ for the BER may satisfy Equation 29. In FIG. 3, the low-rate slope ζ for CASE1, CASE2 and CASE3 may be about 0.55, 0.41 and 0.50, respectively.

$$\zeta \triangleq \lim_{R \to 0} \frac{-\log P_b}{\log R} \quad \text{[Equation 29]}$$

Referring back to FIG. 1, in some example embodiments, the molecular transmitter 100 may perform the encoding operation based on the amplitude modulation in which the first data is encoded by controlling the number of the at least one molecule.

In the amplitude modulation, the molecular transmitter 100 may output a plurality of molecules representing single data within a predetermined duration. In other words, a plurality of first molecules may be used as information carriers for the first data in the amplitude modulation. The number X of the first molecules released from the molecular transmitter 100 may satisfy $X \in \{N_0, N_1\}$ for the first bit value (e.g., "0") and the second bit value (e.g., "1").

In other words, when the first data corresponds to the first bit value in the amplitude modulation, the molecular transmitter 100 may output a first number $N_0$ of the first molecules within a first duration $T_b$ for transmitting the first data. The first number $N_0$ may be less than a reference number. When the first data corresponds to the second bit value in the amplitude modulation, the molecular transmitter 100 may output a second number $N_1$ of the first molecules within the first duration $T_b$ for transmitting the first data. The second number $N_1$ may be equal to or greater than the reference number.

The molecular receiver 200 may detect (e.g., receive) the first molecules, and may perform the decoding operation based on the detected number (e.g., received number) $Y_{am}$ of the first molecules. The detected number $Y_{am}$ of the first molecules may be represented by a sum of a binomial distribution, and may be approximated by Poisson random variable. In other words, the detected number $Y_{am}$ of the first molecules may be $Y_{am} \sim \text{Binom}(X,p)$. Binom(n,p) denotes the binomial distribution with a mean np and a variance np(1−p), and p denotes a probability that the released first molecules arrive at the molecular receiver 200 during the first duration $T_b$ and may satisfy Equation 30.

$$p = 1 - H_{4,4}^{2,2}(R; P_{cdf}) \quad \text{[Equation 30]}$$

In the amplitude modulation, a maximum likelihood detection may satisfy Equation 31 and Equation 32, a detection threshold γth may be obtained based on Equation 33. The BER for the amplitude modulation in the anomalous diffusion may satisfy Equation 34.

$$P_{Y_{am}|X}(y|x) = \binom{x}{y} p^y (1-p)^{x-y}, \, y = 0, 1, 2, \ldots \quad \text{[Equation 32]}$$

$$\frac{\Gamma(N_1 - \gamma_{th} + 1)}{\Gamma(N_0 - \gamma_{th} + 1)} = \frac{N_1!}{N_0!} (1-p)^{N_1 - N_0} \quad \text{[Equation 33]}$$

$$P_b = \frac{1}{2} I_p(\gamma^* + 1, N_0 - \gamma^*) + \frac{1}{2} I_{1-p}(N_1 - \gamma^*, \gamma^* + 1) \quad \text{[Equation 34]}$$

In Equation 33, $\Gamma(x)$ denotes Euler's gamma function. In Equation 34, $\gamma^* = \min\{N_0, \gamma_{th}\}$, and $I_x(a, b)$ denotes a regularized incomplete beta function.

Figure 4:
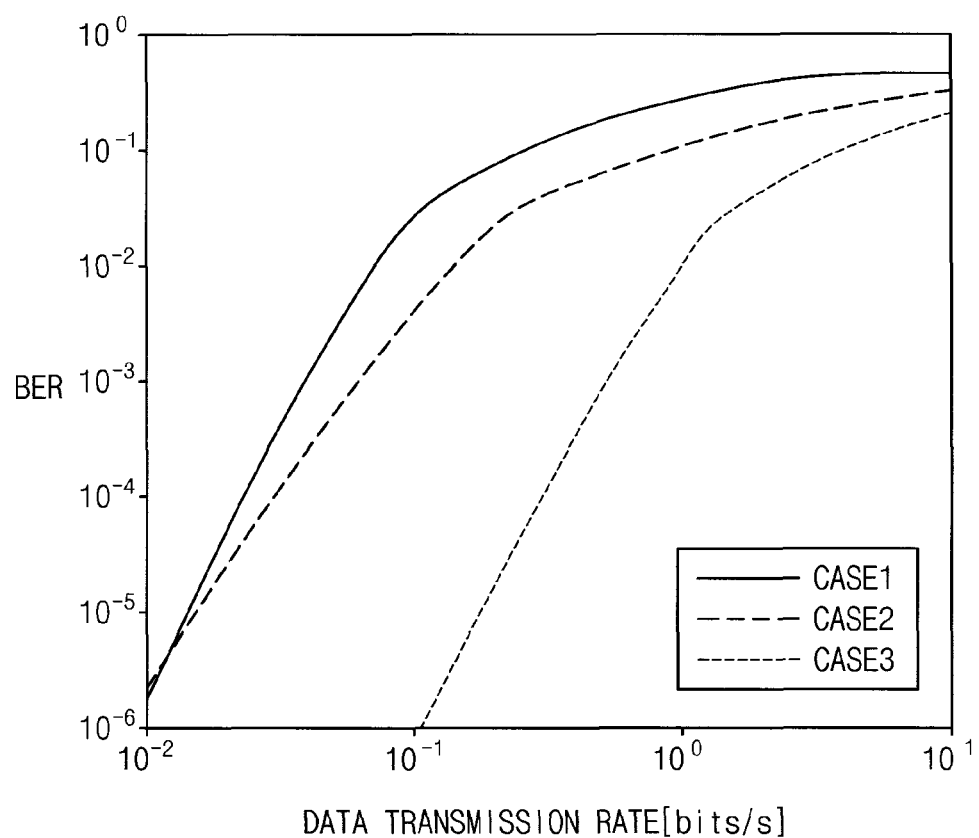
FIGS. 4 and 5 are diagrams for describing a bit error rate for an amplitude modulation in the molecular communication system according to example embodiments.
Figure 5:
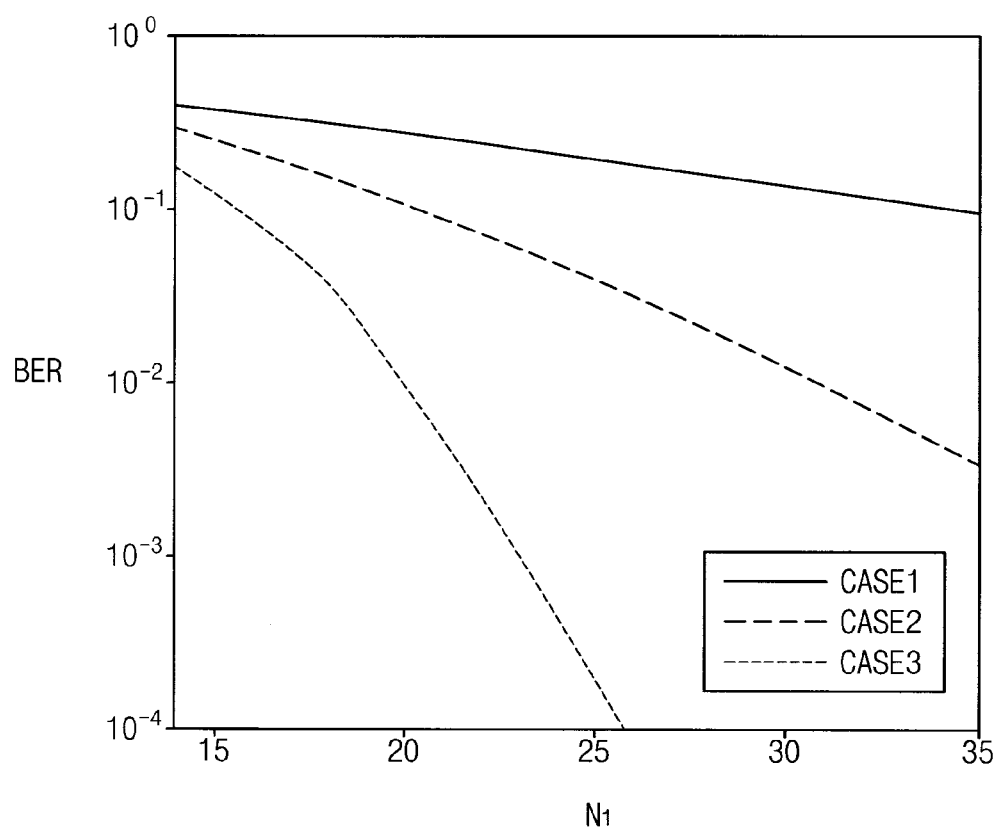

FIGS. 4 and 5 are diagrams for describing a bit error rate for an amplitude modulation in the molecular communication system according to example embodiments.

Referring to FIG. 4, a horizontal axis of a graph represents the data transmission rate, and a vertical axis of the graph represents the BER. In FIG. 4, the first number $N_0$ may be about 10, and the second number $N_1$ may be about 20. CASE1, CASE2 and CASE3 in FIG. 4 may be substantially the same as CASE1, CASE2 and CASE3 in FIG. 2, respectively. The BER in FIG. 4 may have a tendency similar to that of the BER in FIG. 3.

Referring to FIG. 5, a horizontal axis of a graph represents the second number $N_1$, and a vertical axis of the graph represents the BER. In FIG. 5, the first number $N_0$ may be about 10, and the data transmission rate may be about 1 bits/s. CASE1, CASE2 and CASE3 in FIG. 5 may be substantially the same as CASE1, CASE2 and CASE3 in FIG. 2, respectively. The BER in FIG. 5 may decrease as the second number $N_1$ increases.

Figures 6, 7:
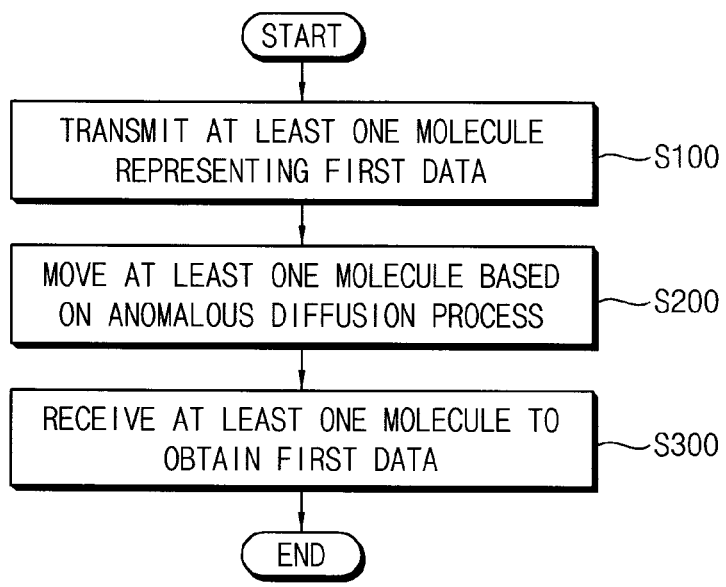
FIG. 6 is a table for describing a detection threshold for the amplitude modulation in the molecular communication system according to example embodiments.
FIG. 7 is a flow chart illustrating a method of operating a molecular communication system according to example embodiments.

FIG. 6 is a table for describing a detection threshold for the amplitude modulation in the molecular communication system according to example embodiments.

Referring to FIG. 6, the first number $N_0$ may be about 10, and the second number $N_1$ may be about 20. CASE1, CASE2 and CASE3 in FIG. 6 may be substantially the same as CASE1, CASE2 and CASE3 in FIG. 2, respectively.

The detection threshold may increase in an order of CASE1, CASE2 and CASE3. For example, it is assumed that the data transmission rate is about 1 bits/s. In the first anomalous diffusion (e.g., CASE1), the first data may be determined to the second bit value (e.g., "1") when the molecular receiver 200 detects more than about 2.86 molecules. In the second anomalous diffusion (e.g., CASE2), the first data may be determined to the second bit value when the molecular receiver 200 detects more than about 7.15 molecules. In the normal diffusion (e.g., CASE3), the first data may be determined to the second bit value when the molecular receiver 200 detects more than about 10 molecules.

In addition, the detection threshold may decrease as the data transmission rate increases. For example, in the second anomalous diffusion (e.g., CASE2) with the data transmission rate of about 0.1 bits/s, the first data may be determined to the second bit value (e.g., "1") when the molecular receiver 200 detects more than about 10 molecules. In the second anomalous diffusion with the data transmission rate of about 1 bits/s, the first data may be determined to the second bit value when the molecular receiver 200 detects more than about 7.15 molecules. In the second anomalous diffusion with the data transmission rate of about 10 bits/s, the first data may be determined to the second bit value when the molecular receiver 200 detects more than about 1.84 molecules.

FIG. 7 is a flow chart illustrating a method of operating a molecular communication system according to example embodiments.

Referring to FIGS. 1 and 7, in a method of operating the molecular communication system 10 according to example embodiments, the at least one molecule representing the first data is transmitted by the molecular transmitter 100 (step S100). The at least one molecule is moved based on an anomalous diffusion process in the molecular transmission channel 300 (step S200). The molecular transmission channel 300 is connected between the molecular transmitter 100 and the molecular receiver 200. The at least one molecule is received by the molecular receiver 200 to obtain the first data based on the at least one molecule (step S300).

In some example embodiments, the anomalous diffusion process in the molecular transmission channel 300 may be modeled based on the FDE. For example, the existence probability w(x,t) of the at least one molecule in the molecular transmission channel 300 depending on the position x and the time t may satisfy Equation 8 that is based on Fox's H-function. The PDF $f_T(t)$ of the FPT T may satisfy Equation 22 and Equation 23 that are based on Fox's H-function.

Figure 8:
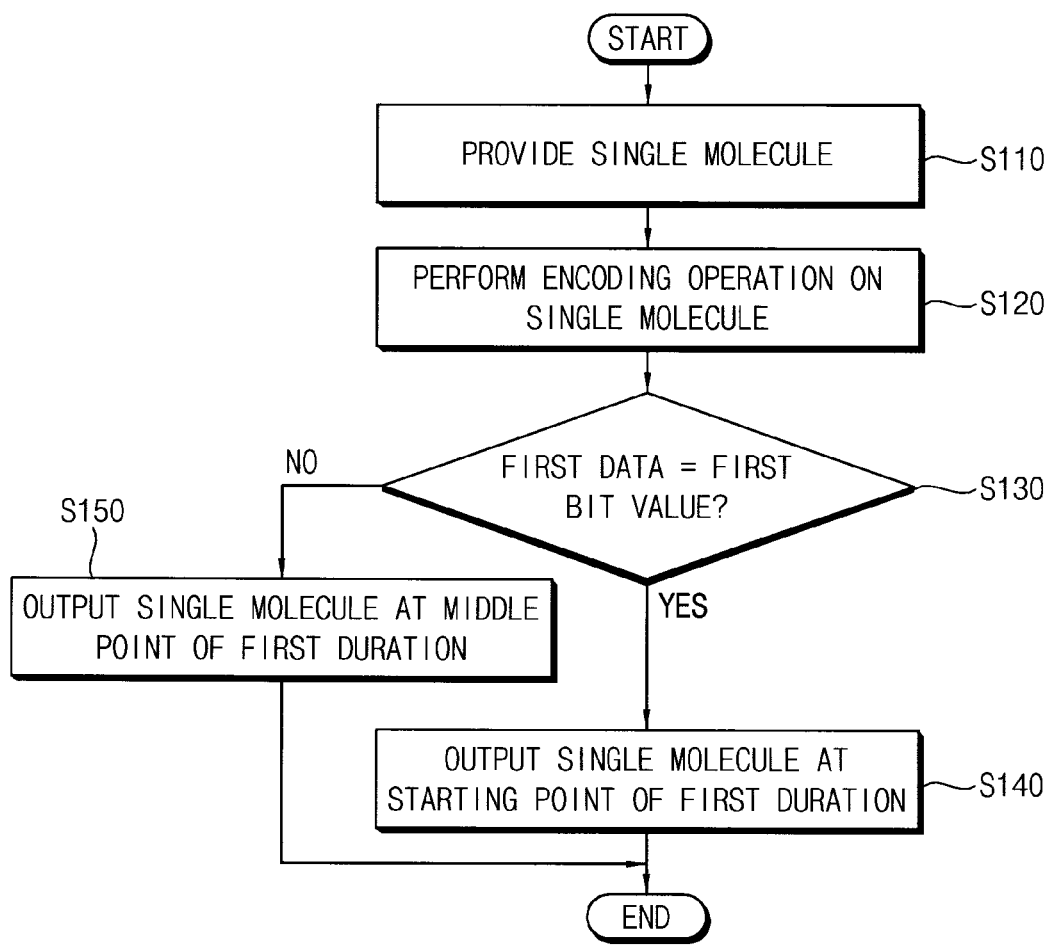
FIGS. 8 and 9 are flow chart illustrating examples of transmitting at least one molecule in FIG. 7.
Figure 9:
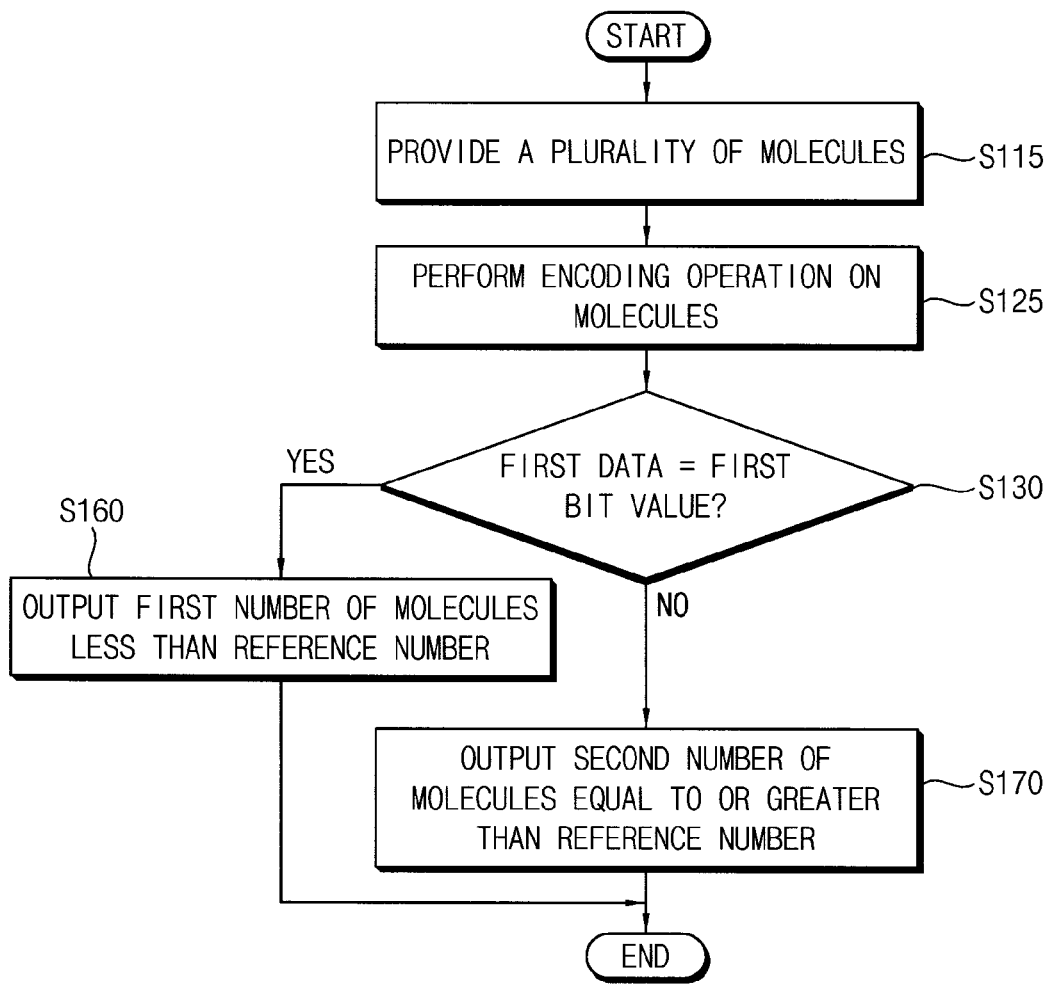

FIGS. 8 and 9 are flow chart illustrating examples of transmitting at least one molecule in FIG. 7.

Referring to FIGS. 1, 7 and 8, in the step S100, the encoding operation may be performed based on the timing modulation in which the first data is encoded by controlling an output timing of a single molecule.

The single molecule may be provided by the molecular supply unit 110 (step S110). The encoding operation may be performed on the single molecule by the encoding unit 120 (step S120). When the first data may correspond to the first bit value (e.g., "0") (step S130: YES), the single molecule may be output at the starting point of the first duration $T_b$ for transmitting the first data by the molecular emitting unit 130 (step S140). When the first data may correspond to the second bit value (e.g., "1") (step S130: NO), the single molecule may be output at the middle point of the first duration $T_b$ for transmitting the first data by the molecular emitting unit 130 (step S150).

In some example embodiments, the molecular receiver 200 may perform a bit detection based on a scheme described above with reference to Equation 26, Equation 27 and Equation 28.

Referring to FIGS. 1, 7 and 9, in the step S100, the encoding operation may be performed based on the amplitude modulation in which the first data is encoded by controlling the number of a plurality of molecules.

The plurality of molecules may be provided by the molecular supply unit 110 (step S115). The encoding operation may be performed on the plurality of molecules by the encoding unit 120 (step S125). When the first data may correspond to the first bit value (e.g., "0") (step S130: YES), the first number $N_0$ of the molecules may be output within the first duration $T_b$ for transmitting the first data by the molecular emitting unit 130 (step S160). The first number $N_0$ may be less than the reference number. When the first data may correspond to the second bit value (e.g., "1") (step S130: NO), the second number $N_1$ of the molecules may be output within the first duration $T_b$ for transmitting the first data by the molecular emitting unit 130 (step S170). The second number $N_1$ may be equal to or greater than the reference number.

In some example embodiments, the molecular receiver 200 may perform the bit detection based on a scheme described above with reference to Equation 31, Equation 32, Equation 33 and Equation 34.

Although not illustrated in FIGS. 8 and 9, in the step S100, the encoding operation may be performed based on a concentration modulation in which the first data is encoded by controlling a density of a plurality of molecules representing the first data.

As will be appreciated by those skilled in the art, the present disclosure may be embodied as a system, method, computer program product, and/or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain, or store a program for use by or in connection with an instruction execution system, apparatus, or device. For example, the computer readable medium may be a non-transitory computer readable medium.

In addition, as will be appreciated by those skilled in the art, the present disclosure may be embodied as any mobile or portable system, such as a mobile phone, a smart phone, a tablet computer, a laptop computer, a personal digital assistants (PDA), a portable multimedia player (PMP), a digital camera, a portable game console, a music player, a camcorder, a video player, a navigation system, etc., or any computing system, such as a personal computer (PC), a server computer, a workstation, a digital television, a set-top box, etc. The mobile system may further include a wearable device, an internet of things (IoT) device, an internet of everything (IoE) device, an e-book, etc.

The present disclosure may be used in any device or system including the image processing device, such as a mobile phone, a smart phone, a PDA, a PMP, a digital camera, a digital television, a set-top box, a music player, a portable game console, a navigation device, a PC, a server computer, a workstation, a tablet computer, a laptop computer, a smart card, a printer, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present disclosure. Accordingly, all such modifications are intended to be included within the scope of the present disclosure as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A molecular communication system comprising:
a molecular transmitter configured to transmit at least one molecule representing first data;
a molecular receiver configured to receive the at least one molecule, and to obtain the first data based on the at least one molecule; and
a molecular transmission channel connected between the molecular transmitter and the molecular receiver, the molecular transmission channel configured to provide a transmission path for the at least one molecule,
wherein the at least one molecule moves in the molecular transmission channel based on an anomalous diffusion process,
wherein the anomalous diffusion process in the molecular transmission channel is modeled based on a fractional diffusion equation (FDE),
where the molecular transmitter is configured to output a single molecule representing single data within a predetermined duration,
wherein when the first data corresponds to a first bit value, the molecular transmitter outputs a single first molecule at a starting point of a first duration for transmitting the first data, and
wherein when the first data corresponds to a second bit value different from the first bit value, the molecular transmitter outputs the single first molecule at a middle point of the first duration for transmitting the first data.

2. The molecular communication system of claim 1, wherein an existence probability w(x,t) of the at least one molecule in the molecular transmission channel satisfies Equation 1:

$$w(x, t) = \frac{1}{\alpha |x|} H_{3,3}^{2,1}\left[\frac{|x|}{K^{\frac{1}{\alpha}} t^{\frac{\mu}{\alpha}}} \middle| \begin{array}{c} \left(1, \frac{1}{\alpha}\right), \left(1, \frac{\mu}{\alpha}\right), \left(1, \frac{1}{2}\right) \\ (1, 1), \left(1, \frac{1}{\alpha}\right), \left(1, \frac{1}{2}\right) \end{array}\right]$$ [Equation 1]

where x denotes a position in the molecular transmission channel, t denotes a time after the at least one molecule is output from the molecular transmitter, K denotes a diffusion coefficient, μ denotes a divergence of waiting time, a denotes a divergence of jump length, and H denotes Fox's H-function.

3. The molecular communication system of claim 2, wherein a probability density function $f_T(t)$ of a first passage time (FPT) T satisfies Equation 2 and Equation 3:

$$f_T(t) = H_{3,3}^{2,1}(1/t; P_{pdf})$$ [Equation 2]

$$P_{pdf} = \left(\frac{2K^{1/\mu}}{\alpha a^{\alpha/\mu}}, \frac{a^{\alpha/\mu}}{K^{1/\mu}}, \left(1 + \frac{1}{\mu}, 2, 1 + \frac{\alpha}{2\mu}\right),\right.$$

$$\left.\left(1 + \frac{\alpha}{\mu}, 1 + \frac{1}{\mu}, 1 + \frac{\alpha}{2\mu}\right), \left(\frac{1}{\mu}, 1, \frac{\alpha}{2\mu}\right), \left(\frac{\alpha}{\mu}, \frac{1}{\mu}, \frac{\alpha}{2\mu}\right)\right)$$ [Equation 3]

where α denotes a length of the molecular transmission channel, and wherein the FPT corresponds an elapsed time during which the at least one molecule is output from the molecular transmitter, and then is arrived at the molecular receiver.

4. The molecular communication system of claim 1, wherein the molecular transmitter is configured to perform an encoding operation based on a timing modulation in which the first data is encoded by controlling an output timing of the at least one molecule.

5. The molecular communication system of claim 1, wherein the molecular transmitter includes:
a molecular supply unit configured to provide the at least one molecule;
an encoding unit configured to perform an encoding operation on the at least one molecule based on one of a timing modulation and an amplitude modulation; and
a molecular emitting unit configured to output the at least one molecule.

6. The molecular communication system of claim 1, wherein the molecular receiver includes:
a molecular receiving unit configured to receive the at least one molecule;
a decoding unit configured to perform a decoding operation on the at least one molecule to obtain the first data; and
a molecular handling unit configured to store, decompose or discharge the at least one molecule.

7. A molecular communication system comprising:
a molecular transmitter configured to transmit at least one molecule representing first data;
a molecular receiver configured to receive the at least one molecule, and to obtain the first data based on the at least one molecule; and
a molecular transmission channel connected between the molecular transmitter and the molecular receiver, the molecular transmission channel configured to provide a transmission path for the at least one molecule,
wherein the at least one molecule moves in the molecular transmission channel based on an anomalous diffusion process,
wherein the anomalous diffusion process in the molecular transmission channel is modeled based on a fractional diffusion equation (FDE),
wherein the molecular transmitter is configured to output a plurality of molecules representing single data within a predetermined duration,
wherein when the first data corresponds to a first bit value, the molecular transmitter outputs a first number of first molecules within a first duration for transmitting the first data,
wherein when the first data corresponds to a second bit value different from the first bit value, the molecular transmitter outputs a second number of the first molecules within the first duration for transmitting the first data, and
wherein the first number is less than a reference number, and the second number is equal to or greater than the reference number.

8. A method of operating a molecular communication system, the method comprising:
transmitting, by a molecular transmitter, at least one molecule representing first data;
moving, in a molecular transmission channel, the at least one molecule based on an anomalous diffusion process; and
receiving, by a molecular receiver, the at least one molecule to obtain the first data based on the at least one molecule,
wherein the molecular transmission channel is connected between the molecular transmitter and the molecular receiver,
wherein the anomalous diffusion process in the molecular transmission channel is modeled based on a fractional diffusion equation (FDE),
wherein the molecular transmitter is configured to output a single molecule representing single data within a predetermined duration, and
wherein transmitting of the at least one molecule includes:
when the first data corresponds to a first bit value, outputting a single first molecule at a starting point of a first duration for transmitting the first data; and
when the first data corresponds to a second bit value different from the first bit value, outputting the single first molecule at a middle point of the first duration for transmitting the first data.

9. The method of claim 8, wherein an existence probability w(x,t) of the at least one molecule in the molecular transmission channel satisfies Equation 4:

$$w(x, t) = \frac{1}{\alpha |x|} H_{3,3}^{2,1}\left[\frac{|x|}{K^{\frac{1}{\alpha}} t^{\frac{\mu}{\alpha}}} \middle| \begin{array}{c} \left(1, \frac{1}{\alpha}\right), \left(1, \frac{\mu}{\alpha}\right), \left(1, \frac{1}{2}\right) \\ (1, 1), \left(1, \frac{1}{\alpha}\right), \left(1, \frac{1}{2}\right) \end{array}\right]$$ [Equation 4]

where x denotes a position in the molecular transmission channel, t denotes a time after the at least one molecule is output from the molecular transmitter, K denotes a diffusion coefficient, μ denotes a divergence of waiting time, α denotes a divergence of jump length, and H denotes Fox's H-function.

10. The method of claim 9, wherein a probability density function $f_T(t)$ of a first passage time (FPT) T satisfies Equation 5 and Equation 6:

$$f_T(t) = H_{3,3}^{2,1}(1/t; P_{pdf})$$ [Equation 5]

$$P_{pdf} = \left( \frac{2K^{1/\mu}}{\alpha a^{\alpha/\mu}}, \frac{a^{\alpha/\mu}}{K^{1/\mu}}, \left(1 + \frac{1}{\mu}, 2, 1 + \frac{\alpha}{2\mu}\right), \left(1 + \frac{\alpha}{\mu}, 1 + \frac{1}{\mu}, 1 + \frac{\alpha}{2\mu}\right), \left(\frac{1}{\mu}, 1, \frac{\alpha}{2\mu}\right), \left(\frac{\alpha}{\mu}, \frac{1}{\mu}, \frac{\alpha}{2\mu}\right) \right)$$ [Equation 6]

where α denotes a length of the molecular transmission channel, and wherein the FPT corresponds an elapsed time during which the at least one molecule is output from the molecular transmitter, and then is arrived at the molecular receiver.

\* \* \* \* \*